US009694632B2

(12) United States Patent
Mancosu et al.

(10) Patent No.: US 9,694,632 B2
(45) Date of Patent: Jul. 4, 2017

(54) DEVICE FOR MONITORING TYRES FOR VEHICLE WHEELS, TYRE PROVIDED WITH SAID MONITORING DEVICE AND METHOD FOR INSTALLING AN ELECTRONIC UNIT IN A TYRE

(71) Applicant: PIRELLI TYRE S.P.A., Milan (IT)

(72) Inventors: Federico Mancosu, Milan (IT); Massimo Brusarosco, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 14/910,293

(22) PCT Filed: Aug. 5, 2014

(86) PCT No.: PCT/IB2014/063710
§ 371 (c)(1),
(2) Date: Feb. 5, 2016

(87) PCT Pub. No.: WO2015/019288
PCT Pub. Date: Feb. 12, 2015

(65) Prior Publication Data
US 2016/0185165 A1    Jun. 30, 2016

(30) Foreign Application Priority Data
Aug. 5, 2013    (IT) .............................. MI2013A1335

(51) Int. Cl.
*E01C 23/00*    (2006.01)
*G01M 17/02*    (2006.01)
(Continued)

(52) U.S. Cl.
CPC .......... *B60C 23/0493* (2013.01); *B60C 19/00* (2013.01); *B60C 23/0408* (2013.01);
(Continued)

(58) Field of Classification Search
CPC ..... B60C 23/20; B60C 19/00; B60C 23/0493; G01M 17/022
(Continued)

(56) References Cited

U.S. PATENT DOCUMENTS

2002/0174925 A1    11/2002    Wilson et al.
2005/0285726 A1    12/2005    Haswell et al.
(Continued)

FOREIGN PATENT DOCUMENTS

DE    10 2007 030 231 A1    1/2009
EP    0 936 089 A2    8/1999
(Continued)

OTHER PUBLICATIONS

International Search Report from the European Patent Office for International Application No. PCT/IB2014/063710, mailing date Nov. 25, 2014, pp. 3.
(Continued)

*Primary Examiner* — Lisa Caputo
*Assistant Examiner* — Roger Hernandez-Prewitt
(74) *Attorney, Agent, or Firm* — Finnegan, Henderson, Farabow, Garrett & Dunner, L.L.P.

(57) ABSTRACT

A device for monitoring tires for vehicle wheels, includes: an electronic unit adapted to detect at least one characteristic quantity of a tire and to transmit at least one corresponding parameter representative of said detected quantity; a connection element to keep the electronic unit constrained to an internal surface of the tire, the connection element including a first portion having a base surface adapted to be secured to the inner surface of the tire, and a cavity for housing the electronic unit wherein the first portion has at least one slot interposed between the electronic unit and the projection thereof on the base surface, the slot having a distal profile relative to the electronic unit which is entirely contained in
(Continued)

the base surface. A tire for vehicle wheels provided with the monitoring device and a method for installing the electronic unit in the tire.

20 Claims, 7 Drawing Sheets

(51) Int. Cl.
 *B60C 23/04*   (2006.01)
 *B60C 19/00*   (2006.01)
 *B60C 23/06*   (2006.01)
 *B60C 23/20*   (2006.01)
 *B29D 30/00*   (2006.01)

(52) U.S. Cl.
 CPC ...... *B60C 23/0486* (2013.01); *B60C 23/0488* (2013.01); *B60C 23/064* (2013.01); *B60C 23/20* (2013.01); *G01M 17/022* (2013.01); *B29D 2030/0077* (2013.01)

(58) Field of Classification Search
 USPC .......................... 73/146; 116/34 R; 206/304
 See application file for complete search history.

(56) References Cited

U.S. PATENT DOCUMENTS

| | | |
|---|---|---|
| 2006/0158340 A1 | 7/2006 | Wilson et al. |
| 2007/0063621 A1 | 3/2007 | Haswell et al. |
| 2007/0063869 A1 | 3/2007 | Haswell et al. |
| 2009/0115591 A1* | 5/2009 | Mancosu ............ B60C 23/0493 340/447 |
| 2009/0183562 A1* | 7/2009 | Brusarosco ......... B60C 23/0493 73/146.5 |

FOREIGN PATENT DOCUMENTS

| | | |
|---|---|---|
| WO | WO 2005/005950 A1 | 1/2005 |
| WO | WO 2005/042281 A1 | 5/2005 |
| WO | WO 2005/042322 A1 | 5/2005 |
| WO | WO 2005/043106 A1 | 5/2005 |
| WO | WO 2006/034731 A1 | 4/2006 |
| WO | WO 2006/103706 A1 | 10/2006 |
| WO | WO 2007/000781 A1 | 1/2007 |
| WO | WO 2007/102175 A1 | 9/2007 |
| WO | WO 2007/121768 A1 | 11/2007 |
| WO | WO 2008/065465 A1 | 6/2008 |
| WO | WO 2010/043264 A1 | 4/2010 |
| WO | WO 2010/046871 A1 | 4/2010 |
| WO | WO 2010/046872 A1 | 4/2010 |
| WO | WO 2010/073272 A1 | 7/2010 |
| WO | WO 2012/042369 A1 | 4/2012 |
| WO | WO 2012/085649 A2 | 6/2012 |
| WO | WO 2012/085655 A2 | 6/2012 |
| WO | WO 2013/098711 A1 | 7/2013 |
| WO | WO 2013/098712 A1 | 7/2013 |

OTHER PUBLICATIONS

Written Opinion of the International Searching Authority from the European Patent Office for International Application No. PCT/IB2014/063710, mailing date Nov. 25, 2014, pp. 3.

\* cited by examiner

DEVICE FOR MONITORING TYRES FOR VEHICLE WHEELS, TYRE PROVIDED WITH SAID MONITORING DEVICE AND METHOD FOR INSTALLING AN ELECTRONIC UNIT IN A TYRE

CROSS REFERENCE TO RELATED APPLICATIONS

This application is a national phase application based on PCT/IB2014/063710, filed Aug. 5, 2014, which claims the priority of Italian Patent Application No. MI2013A001335, filed Aug. 5, 2013, the content of both applications being incorporated herein by reference.

BACKGROUND OF THE INVENTION

Field of the Invention

The present invention refers to a device for monitoring tyres for vehicle wheels.

The invention further refers to a tyre for vehicle wheels provided with said monitoring device.

The invention refers also to a method for installing an electronic unit in a tyre for vehicle wheels.

Description of the Related Art

For some types of tyres, above all the ones for which high-level performances are required, monitoring devices have been studied for a long time that, being mounted inside said tyres, will have the function of detecting characteristic quantities of the tyre, in order to allow a control of the functioning and of the conditions of the tyre itself substantially in real time.

Such monitoring devices will periodically communicate with the instruments available on board of the vehicle, so that all the relevant information will be provided to the driver and/or to control systems of the vehicle, for example for activating or for regulating at best warning systems and/or controlling systems of the vehicle, of the braking, etc.

The monitoring devices for tyres typically comprise an electronic unit and a connection element. The electronic unit comprises at least one sensor, for example a temperature sensor, a pressure sensor, a sensor able to measure/identify the deformations undergone by the tyre while rolling, such as for example an accelerometer, a strain gauge, etc., and a transmission system for sending the data detected by said at least one sensor.

The connection element has the function of keeping the electronic unit constrained to the tyre. In particular, in order to identify and to measure the deformations undergone by the tyre and to estimate, from said deformations, some parameters (e.g. the Length of the tyre footprint, the load weighing on the tyre, the angular speed, the friction between the tyre and the rolling surface, the wear of the tyre, etc.), it may be convenient to have one or more monitoring devices in correspondence of the crown portion of the tyre, namely the one placed in correspondence of the tread band of the tyre itself. In particular, it may be convenient to arrange one or more monitoring devices on the inner surface of the tyre, for example on the portion of inner surface opposite to the tread band.

A fundamental problem of the connection elements relates to the fact that the tyre, above all at the beginning and at the end of the tyre footprint area, undergoes mechanical stresses which provoke relevant deformations. On the other hand, the case which houses the electronic unit is typically made of a substantially rigid material, in order to protect its content and to allow a correct functioning of the electronic unit itself.

The fact that the electronic unit (rigid) should be constrained to the inner surface of the tyre (that undergoes deformation) is a very critical aspect for the connection element: the latter, although being secured to the inner surface of the tyre, and thus being subject to the same stresses as the tyre, has to keep a reliable and durable constraint with a substantially non-deformable object, namely the case of the electronic unit.

The Applicant verified that, in case the connection element is not properly structured, the exchange of stresses between the case of the electronic unit and the connection element may bring to tears and/or breakings of the connection element itself, up to release the electronic unit from the tyre. Such tears may also have microscopic dimensions, initially, and then progressively expand up to compromise the structural integrity of the connection element. The electronic unit, after the breaking of the connection element, will be then free to move inside the tyre during the rolling of the tyre itself, with consequent problems for a correct detection and transmission of the data, and with the risk of breakings and/or failures of the electronic unit itself.

Such problem was faced and solved by the monitoring devices described in the patent applications WO2010/043264, WO2006/103706, WO2007/000781, WO2007/121768, WO2013/098711, WO2013/098712 in the name of the same Applicant.

The shape of the connection elements used in such monitoring devices allows to obtain a mechanical decoupling between the electronic unit and the deformations undergone by the inner surface of the tyre, thus providing a reliable and durable constraint.

With more detail, such connection elements have two separate base surfaces intended to be connected to the inner surface of the tyres so that the mechanical stresses undergone by the tyre are absorbed by the connection element, also by virtue of the fact that the two base surfaces can be deformed/moved in a substantially mutually independent way, thus following the deformations of the inner surface of the tyre. Only a small part of such deformations/stresses are thus transmitted to the electronic unit, thereby significantly reducing the risk that the rigidness of the case may damage the connection element.

The Applicant, however, noticed that this type of connection elements cannot be effectively used for particular categories of sensors, which indeed have the function to detect the stresses and the deformations undergone by the tyre, particularly in correspondence of the tyre footprint area.

Such sensors, indeed, may be adapted to detect data useful to identify particular operating conditions/situations, such as for example the friction between the tyre and the road surface, the forces exchanged in the tyre footprint area, the evolution of the shape of the tyre footprint area, the wear of the tyre, an aquaplaning condition, etc., that are determined based on the analysis of the mechanical stresses in tangential, longitudinal and/or radial direction undergone by the tyre.

By way of example, it is possible to consider the processing techniques described in the patent applications WO2005/005950, WO2005/043106, WO2005/042281, WO2005/042322, WO2006/034731, WO2007/102175, WO2008/065465, WO2010/046872, WO2010/046871, WO2010/073272, WO2012/042369, WO2012/085649, WO2012/085655, in the name of the same Applicant.

SUMMARY OF THE INVENTION

The Applicant thus perceived that, in order to use correctly also the sensors of this type, it is necessary to provide a connection element that keeps the electronic unit firmly constrained to the tyre and, at the same time, reduces as much as possible the filtering and/or dampening of the deformations, so as to allow the sensor included in the electronic unit to detect, in the most reliable and precise way, the mechanical stresses undergone by the tyre.

In order to search for an appropriate technical solution, the Applicant has carried out an in-depth analysis about connection elements comprising a first portion intended to be secured to the tyre, and a cavity intended to contain the electronic unit, wherein the first portion serves as "radial extension" of the inner surface of the tyre and allows to make the electronic unit substantially integral with the inner surface itself, so as to detect its stresses and the respective deformations in an appropriate way.

The patent application EP936089 describes an example of connection element of this type.

Although the results were good in terms of the quality of the detection of the stresses undergone by the tyre, the Applicant verified that the service life of the connection element is highly unsatisfactory: the monitoring device, indeed, remains intact and constrained to the tyre for a time/distance/speed significantly lower than required.

The Applicant thus made the hypothesis that the stresses due, from the one hand, to the rigidity of the electronic unit and, from the other hand, to the deformations of the inner surface of the tyre, are concentrated particularly in the area immediately underneath the electronic unit itself.

Thus the Applicant had the intuition that, in order to reduce the risk of detachment and/or of tears/breakings of the connection element, it is possible to increase, up to a certain extent, the deformability of the connection element itself, particularly in the central zone of its first portion, namely in the area underneath the electronic unit.

The Applicant thus found that, by making a slot in a substantially central zone of the connection element, in the area underneath the electronic unit, the connection element itself is able to absorb part of the deformations transmitted by the inner surface of the tyre, ensuring a higher resistance of the connection element and, at the same time, allowing the control unit to detect the quantities of interest relating to the tyre in a precise and reliable way.

According to a first aspect, an object of the present invention is a monitoring device for tyres for vehicle wheels, said monitoring device comprising:

an electronic unit adapted to detect at least one characteristic quantity of a tyre and to transmit at least one corresponding parameter representative of said detected quantity;

a connection element for keeping said electronic unit constrained to an inner surface of said tyre, said connection element comprising at least a first portion with a base surface adapted to be secured to the inner surface of said tyre, and a cavity for housing said electronic unit;

wherein said first portion has at least one slot which is interposed between the electronic unit and the projection thereof on said base surface, said slot having a distal profile relative to said electronic unit which is entirely contained in said base surface.

According to another aspect, an object of the present invention is a tyre for vehicle wheels, comprising:

an inner surface having a substantially toroidal shape;

a monitoring device operatively connected to said inner surface of said tyre, said device comprising:

an electronic unit adapted to detect at least one characteristic quantity of said tyre and to transmit at least one corresponding parameter representative of said detected quantity;

a connection element for keeping said electronic unit constrained to the inner surface of said tyre, said connection element comprising at least a first portion with a base surface secured to the inner surface of said tyre, and a cavity for housing said electronic unit;

wherein said first portion has at least one slot which is interposed between the electronic unit and the projection thereof on said base surface, said slot having a distal profile relative to said electronic unit which is entirely contained in said base surface.

According to a further aspect, an object of the present invention is a method for installing an electronic unit on a tyre for vehicle wheels, comprising:

providing a tyre for vehicle wheels, with an inner surface having a substantially toroidal shape;

providing an electronic unit adapted to detect at least one characteristic quantity of said tyre and to transmit at least one corresponding parameter representative of said detected quantity;

providing a connection element comprising a first portion having a base surface and a cavity;

placing said electronic unit into the cavity of the first portion of said connection element, said first portion having at least one slot interposed between the electronic unit and the projection thereof on said base surface, said slot having a distal profile relative to said electronic unit which is entirely contained in said base surface;

securing the base surface of the first portion of said connection element to the inner surface of said tyre.

The Applicant believes that, in this way, it is possible to obtain a durable constraint between the monitoring device and the inner surface of the tyre and, at the same time, the electronic unit can detect in a reliable way the mechanical stresses and the deformations undergone by the tyre, above all in correspondence of the tyre footprint area. Otherwise, the Applicant believes that the stresses undergone by the monitoring device risk to provoke the detachment and/or tears/breakings of the connection element, thus compromising the functioning and the integrity of the electronic unit.

Without being bound to any specific interpretative theory, the Applicant believes indeed that said slot allows the connection element to suitably absorb the deformations transmitted by the inner surface of the tyre, without compromising the quality of the detection carried out by the control unit.

The Applicant further believes that said slot allows to store, at least temporarily, a certain quantity of air that tends to accumulate, in particular in the central zone of the base surface of the connection element, due to the movement of the connection element provoked by the deformations of the inner surface of the tyre due to the rolling of the latter. The Applicant believes that the presence of the slot prevents or highly reduces the possibility of said air to force the constraint between the base surface itself and the inner surface of the tyre and may contribute to a detachment of the monitoring device.

In accordance with one or more of the aspects mentioned above, the invention comprises one or more of the preferred features described herebelow.

Preferably said slot has an elongated shape with a main extension direction substantially parallel to said base surface.

Preferably said slot extends at least between two perimetric points of the projection of the electronic unit on the base surface of said first portion.

Preferably said two perimetric points are opposite to each other relative to a geometric centre of said projection of the electronic unit on the base surface.

Preferably the projection of the electronic unit on the base surface has a substantially circular profile, said perimetric points being diametrically opposed points belonging to said substantially circular profile.

Preferably said main extension direction joins said perimetric points.

Preferably said slot has a depth, in a direction substantially orthogonal to said base surface, comprised between about 1 mm and about 5 mm.

Preferably said slot has a width, in a direction substantially orthogonal to said main extension direction and parallel to said base surface, comprised between about 1 mm and about 5 mm.

Preferably said slot has a width, in a direction substantially orthogonal to said main extension direction and parallel to said base surface, comprised between about 50% and about 150% of said depth.

Preferably said slot has a substantially parallelepiped shape.

Preferably said first portion further comprises one or more grooves formed in said base surface.

The Applicant verified that, with this configuration, the constraint between the base surface of the connection element and the inner surface of the tyre is particularly effective up to a high speed.

The Applicant believes, indeed, that said one or more grooves facilitate the adaptation of the base surface to the curved shape and to the deformations of the inner surface of the tyre, thus improving the durability of the constraint between the monitoring device and the tyre.

The Applicant believes also that said one or more grooves may contribute to free the air possibly stored in the hollow space between the base surface and the internal surface of the tyre, further improving the quality of the constraint between the monitoring device and the tyre.

Preferably said one or more grooves comprise at least a first and a second groove.

Preferably said first and second grooves are substantially parallel to the main extension of said groove.

Preferably said first and second grooves are substantially equidistant from said slot.

Preferably said first and second grooves join perimetric points of said base surface.

Preferably said base surface has a substantially circular profile, said first and second grooves being arranged along respective chords of said substantially circular profile.

Preferably said one or more grooves comprise a third groove joining said first and second grooves.

Preferably the third groove is substantially orthogonal to the main extension direction of said slot.

Preferably said slot has a depth, measured in a direction orthogonal to said base surface, which is greater than a depth of said first and second grooves.

Preferably the first portion of said connection element has a shape which is tapered from said base surface towards an upper edge of said cavity.

Thus, a sufficiently wide contact surface between the connection element and the inner surface of the tyre, so as to ensure a stable and durable constraint, and a limited overall mass of the monitoring device are obtained at the same time.

Preferably the first portion of said connection element has an axial symmetry relative to a main axis substantially orthogonal to said base surface passing through a geometric centre of said circular shape.

Preferably said connection element further comprises a second portion secured to said cavity and housing said electronic unit.

Preferably the second portion of said connection element has:
  a. a base wall, in contact with a bottom surface of said first portion, and
  b. a side wall in contact with an internal side surface of said first portion,
said cavity being defined by said bottom surface and said internal side surface.

Preferably the base surface of the first portion of said connection element is secured to the inner surface of said tyre so that the main extension direction of said slot is substantially orthogonal to a circumferential direction of said tyre.

BRIEF DESCRIPTION OF THE DRAWINGS

Further features and advantages will become more apparent from the detailed description of a preferred, but not exclusive, embodiment of the invention. Such description is provided in the following with reference to the attached drawings, given by way of non-limiting example, wherein.

DETAILED DESCRIPTION OF THE INVENTION

With reference to the attached figures, 1 indicates a monitoring device for tyres of vehicle wheels in accordance to an aspect of the present invention.

The monitoring device 1 comprises first of all an electronic unit 10 (FIGS. 10-11) adapted to detect at least one characteristic quantity of a tyre and to transmit at least one corresponding parameter representative of said detected quantity.

Figure 10:
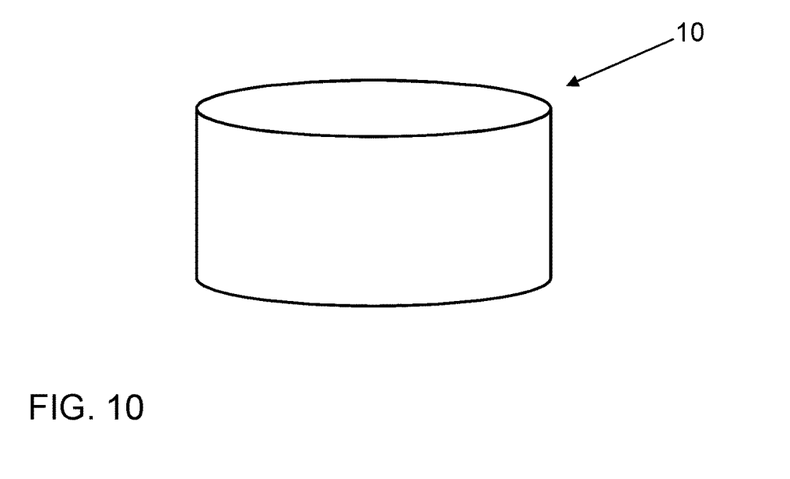
FIG. 10 shows a perspective schematic view of an electronic unit forming part of the monitoring device in accordance with the present invention.
Figure 11:
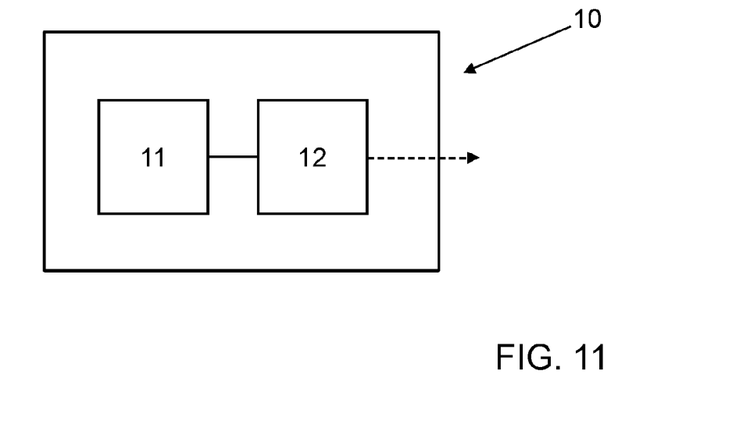
FIG. 11 shows a simplified block diagram of the electronic unit of FIG. 10.

For this purpose, the electronic unit 10 can be provided with at least one sensor 11, operatively associated to a processing/transmission system 12.

The at least one sensor 11 can be, for example a temperature sensor, a pressure sensor, a sensor able to measure the deformations undergone by the tyre while rolling, such as for example a strain gauge, an accelerometer, an optical sensor able to detect movement, a magnetoresistive sensor, an inertial sensor, a gyroscope, etc.

The processing/transmission system 12, operatively connected to said at least one sensor, acquires, processes and transmits the data detected by the latter.

The processing/transmission system 12 preferably comprises a microprocessor, an antenna and other circuitry necessary to process and/or analyze the signals coming from the at least one sensor 11, in order to make them suitable data transmission from the monitoring device 1 towards a receiver placed on board of a vehicle.

In an embodiment, the data made available by the sensor 11 can be processed directly by the system 12, advantageously provided with an appropriate microprocessor or integrated circuit (e.g. of the ASIC type—Application Specific Integrated Circuit).

The processing/transmission system 12 thus allows a communication with the instruments available on board of the vehicle, for example periodically, so that all the relevant information can be provided to the driver and/or to a control system of the vehicle, and/or so that warning systems and/or systems for controlling the dynamics of the vehicle, of the braking, etc. can be activated or regulated at best.

Such communication can be unidirectional (from the processing/transmission system 12 to the instruments on board of the vehicle) or bidirectional.

The monitoring system 1 further comprises a connection element 20 (FIGS. 1-9), having the function of keeping the electronic unit 10 constrained to a portion of the tyre 100.

In the embodiment shown in the figures, the connection element 20 comprises a first portion 30 and a second portion 40.

The first portion 30 is preferably made of polymeric material. For example it can be made of elastomeric material.

By way of example, such elastomeric material can be obtained by a vulcanization of a crosslinkable elastomeric compound comprising a synthetic diene rubber, preferably in a quantity comprised between 20 and 80 phr, and a halogenated butyl rubber, preferably in a quantity comprised between 80 and 20 phr, as described in the aforementioned international patent application WO2010/043264, in the name of the same Applicant.

The first portion 30 has a base surface 31 adapted to be secured to the inner surface 100a of the tyre 100.

Preferably the base surface 31 has a substantially circular shape. By way of example, such circular shape can have a diameter comprised between about 30 mm and about 100 mm.

Preferably the base surface 31 has an area larger than about 700 mm$^2$, more preferably smaller than 7000 mm$^2$.

Figure 1:
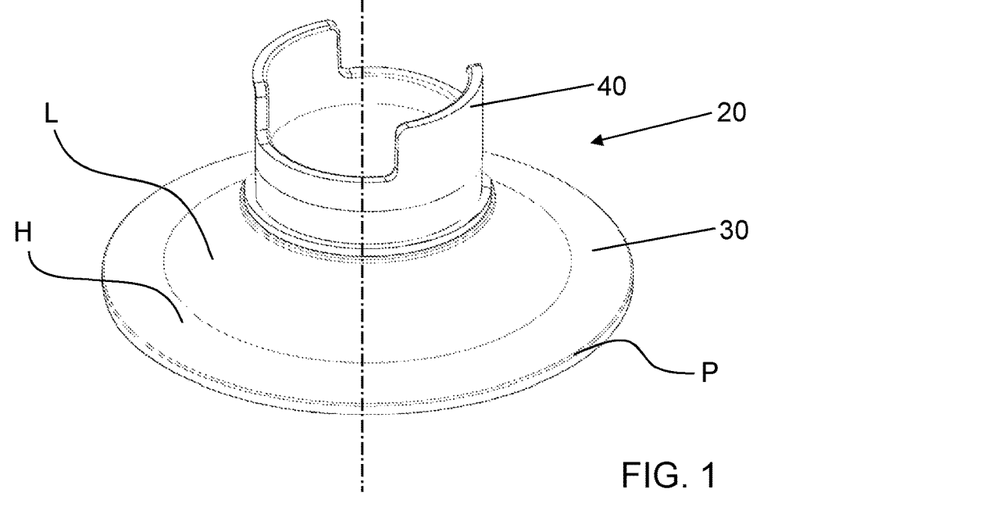
FIG. 1 shows a perspective schematic view of a connection element included in a monitoring device in accordance with the present invention.
Figure 13:
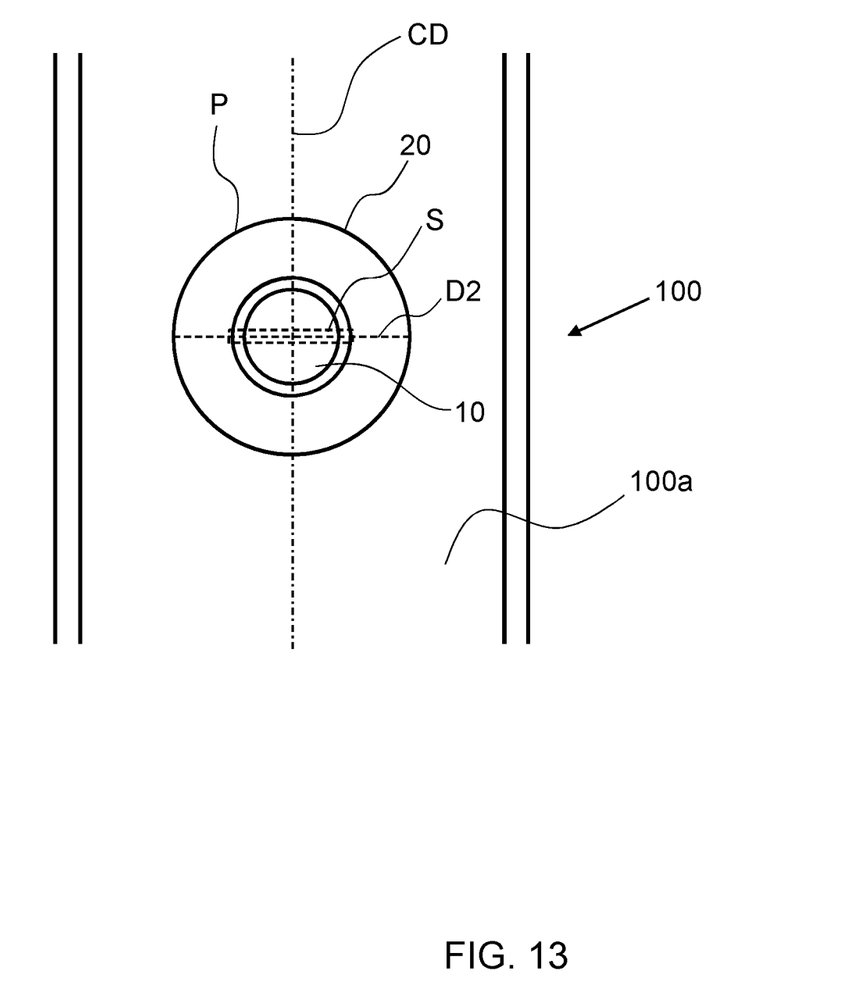
FIG. 13 shows schematically a top view of the monitoring device of FIG. 12 installed inside the tyre.

Advantageously the base surface 31 is delimited by a closed and substantially uninterrupted perimeter P (FIGS. 1, 13).

Thus such perimeter P substantially delimitates the portion of connection element 20 that is kept in contact with the inner surface 100a of the tyre 100.

In the preferred embodiment, the connection element 20 has one single base surface 31, by means of which the connection element 20 itself is kept constrained to the inner surface 100a of the tyre 100.

The first portion 30 has at least one slot S which is interposed between the electronic unit 10 and the projection PX thereof on said base surface 31.

Figure 2:
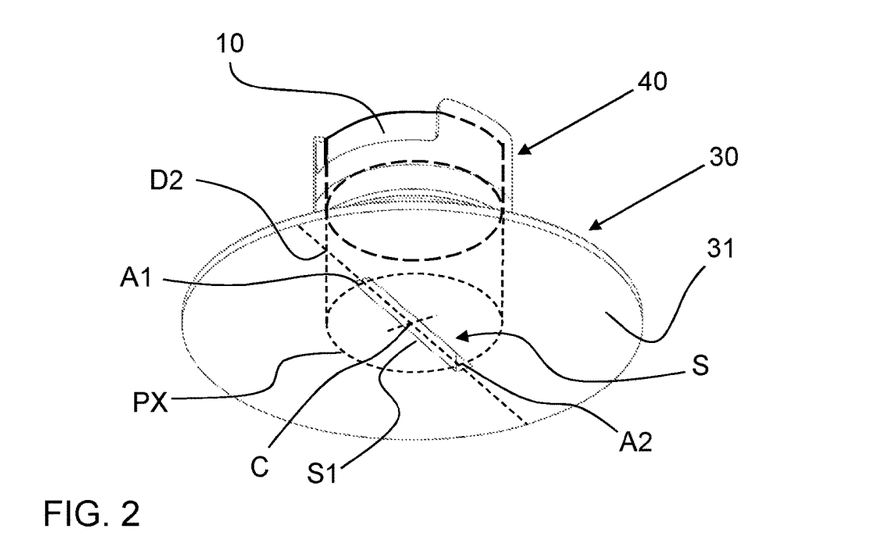
FIG. 2 shows a perspective schematic view of the element of FIG. 1 according to a different angle, wherein an electronic unit is housed in said connection element.

Such projection PX is schematically shown in FIG. 2.

Figure 3:
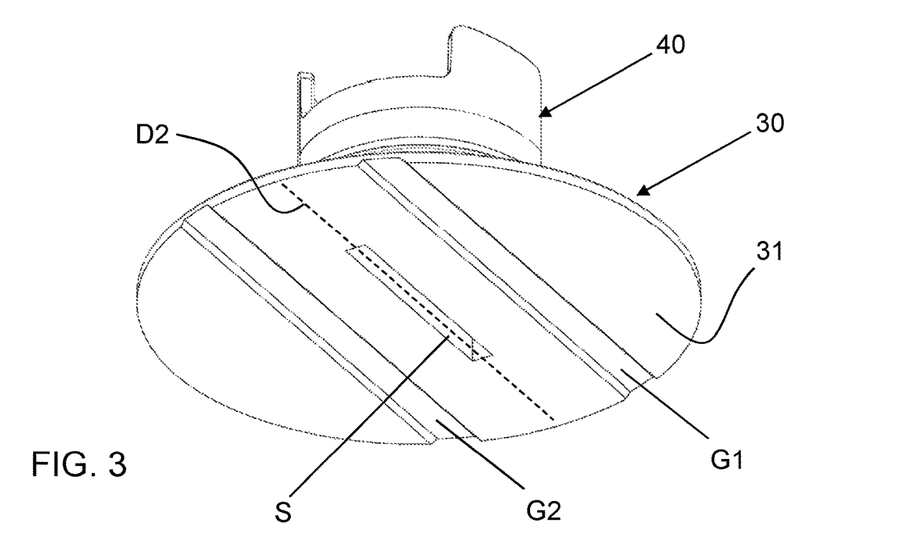
FIG. 3 shows a perspective schematic view of a different embodiment of the element of FIG. 2, wherein the electronic unit is not shown.
Figure 4:
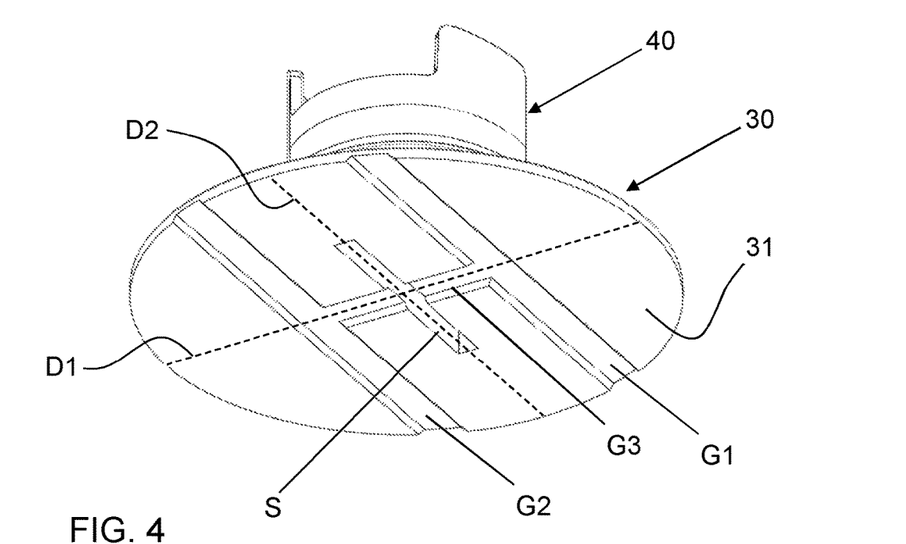
FIG. 4 shows a perspective schematic view of a further different embodiment of the element shown in FIGS. 2 and 3, wherein the electronic unit is not shown.

By observing FIGS. 2-4 it is possible to notice that the slot S is in a substantially central zone of the base surface 31, in correspondence of the electronic unit 10.

The slot S has a distal profile S1 relative to said electronic unit 10 which is entirely contained in said base surface 31.

Advantageously the profile S1 of the slot S is entirely contained within the perimeter P of the base surface 31.

In other words, the slot S does not join perimetric points of the base surface 31.

The Applicant believes that the presence of the slot S thus obtained allows the connection element to absorb in an appropriate way the deformations transmitted by the inner surface of the tyre, without compromising the quality of the detection carried out by the control unit.

Preferably the slot S has an elongated shape in a main extension direction substantially parallel to the base surface 31. As it can be seen in FIGS. 2-4, such main extension direction may coincide with a diameter D2 of the base surface 31, in case the latter has a substantially circular profile.

Preferably said slot S extends at least between two perimetric points A1, A2 of the projection PX of the electronic unit 10 on the base surface 31 of said first portion 30.

Preferably said two perimetric points A1, A2 are opposite to each other relative to a geometric centre of said projection PX of the electronic, unit 10 on the base surface 31.

In the preferred embodiment, the geometric centre of the projection PX coincides with the geometric centre C of the base surface 31.

Preferably the projection PX of the electronic unit 10 on the base surface 31 has a substantially circular profile, and the perimetric points A1, A2 are diametrically opposite points belonging to said substantially circular profile.

Preferably the main extension direction of the slot S joins the perimetric points A1, A2.

Preferably the slot S has a depth, in a direction substantially orthogonal to the base surface 31, comprised between about 1 mm and about 5 mm.

Preferably said slot has a width, in a direction substantially orthogonal to the main extension direction and parallel to the base surface 31, comprised between about 1 mm and about 5 mm.

Preferably the slot S has a width, in a direction substantially orthogonal to the main extension direction and parallel to the base surface 31, comprised between about 50% and about 150% of said depth.

Preferably the width of the slot S is such that the borders orthogonal to the main extension of the slot S itself do not come in contact with each other during the rolling of the tyre 100, and in particular at the beginning and at the end areas of the tyre footprint area.

Preferably, the length of the slot S measured along the main extension direction may be comprised between about 25% and about 75% of the length of a diameter of the circumferential profile of the base surface 31.

Preferably the slot S has a substantially parallelepiped shape, wherein the longer side coincides with the main extension direction of the slot S itself.

Figure 6:
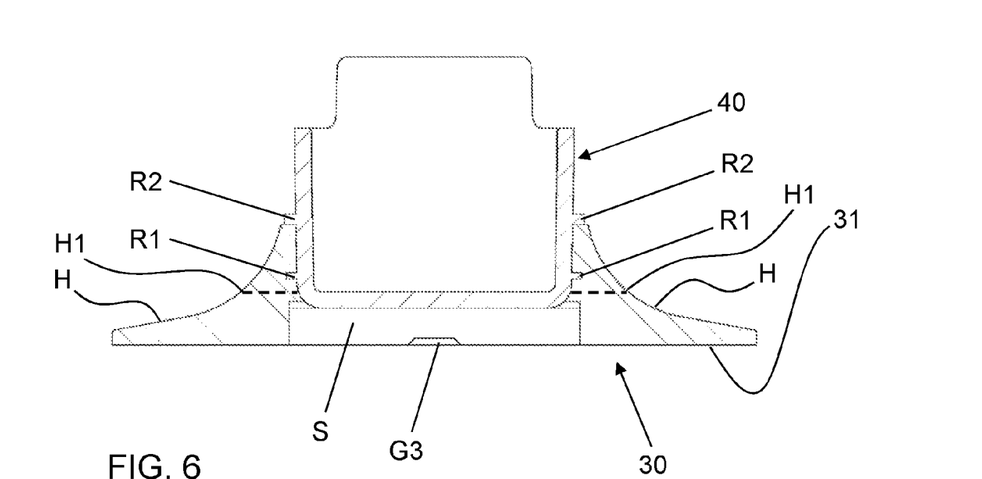
FIG. 6 shows a sectioned view taken along line a-a of the element shown in FIG. 5.

Advantageously at least the part of the first portion 30 which is interposed between the electronic unit 10 and the base surface 31 is delimited by a substantially continuous perimetric surface H (FIGS. 1, 6).

By way of example, in FIG. 6, the part of the first portion 30 which is interposed between the electronic unit 10 and the base surface 31 is superiorly delimited by the dashed line H1.

The part of the first portion 30 which is interposed between the electronic unit 10 and the base surface 31 is thus preferably made in a single piece. This allows to keep the electronic unit 10 firmly constrained to the tyre and, at the same time, to reduce the filtering and/or dampening of the deformations undergone by the tyre, so as to allow to the sensor or to the sensors included in the electronic unit 10 to detect, in the most reliable and precise way, the mechanical stresses undergone by the tyre.

Preferably the entire projection of the electronic unit 10 upon the base surface 31 is confined within the perimeter P of the base surface 31 itself, as schematically shown in FIGS. 2 and 13.

In other words, when the monitoring device is not mounted, yet, inside a tyre, the projection of the electronic unit 10 upon the plane where the base surface 31 lies is entirely confined within the perimeter P of the base surface 31 itself.

Figure 5:
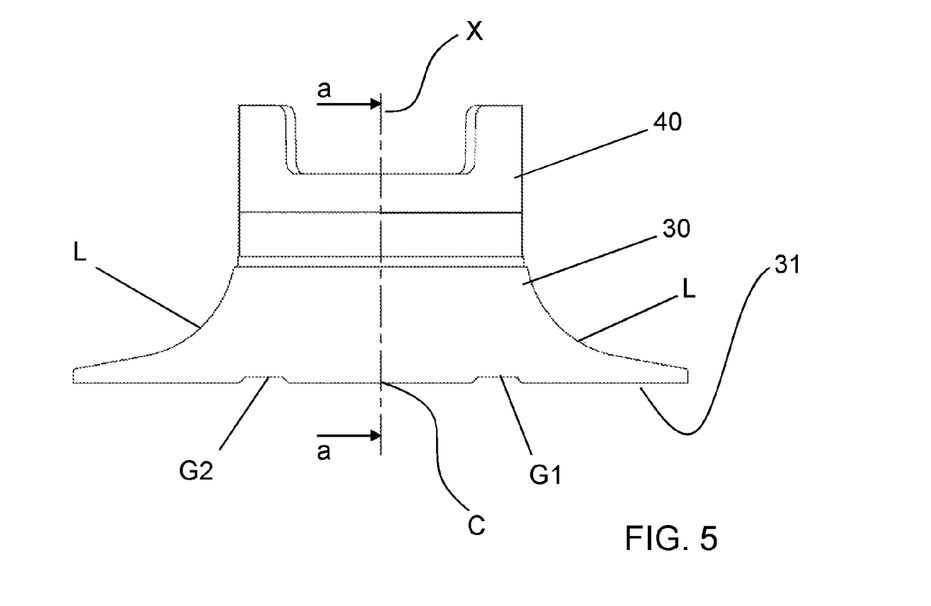
FIG. 5 shows a side view of the element shown in FIGS. 2-4, wherein the electronic unit is not shown.

In practice, when the monitoring device 1 is completely assembled, and also when the monitoring device 1 itself is not mounted yet inside, the tyre, neither the electronic unit 10, nor the second portion 40 of the connection element 20 can be released from the first portion 10 by means of a movement towards and/or through the base surface 31, namely a downward movement, by observing for example FIGS. 5 and 6.

Preferably, the first portion 30 of the connection element 20 comprises one or more grooves G1, G2, G3 obtained in the base surface 31.

In particular, said one or more grooves may comprise at least a first and a second grooves G1, G2 obtained in said base surface 31.

Preferably, each one of the first and second grooves G1, G2 joins a pair of perimetric points of the base surface 31.

Preferably, said first and a second grooves G1, G2 are arranged along respective chords of the circular shape of the base surface 31.

It has to be noted that the chords along which the first and the second groove G1, G2 are arranged are not diameters of the circular shape of the base surface 31. In other words, the first and the second groove G1, G2 do not pass through the geometric centre C of the base surface 31.

Preferably the first and second grooves G1, G2 are substantially parallel to each other.

By way of example, the distance between the first and the second groove G1, G2 can be comprised between 7 mm and about 40 mm.

Preferably, the first and/or the second groove G1, G2 may have an average width, measured in a direction orthogonal to their main extension and parallel to the base surface 31, comprised between 2 mm and about 5 mm.

Preferably the first and second grooves G1, G2 are positioned on opposite sides relative to a geometric centre C of said base surface 31.

Preferably the first and the second groove G1, G2 are substantially symmetrical relative to a diameter D2 of the circular shape of the base surface 31. In particular such diameter D2 can be substantially parallel to the first and second grooves G1, G2.

Preferably said one or more grooves further comprise a third groove G3 obtained in the base surface 31 and joining the first and the second grooves G1, G2 (FIGS. 3, 4, 6).

Preferably the third groove G3 is substantially arranged along a portion of a first diameter D1 of the circular shape of the base surface 31.

Preferably said third groove G3 is delimited by the first and second grooves G1, G2.

Preferably, the third groove G3 may have an average width, measured in a direction orthogonal to its main extension and parallel to the base surface 31, comprised between 2 mm and about 6 mm.

Preferably the third groove G3 is substantially orthogonal to the first and second grooves G1, G2.

In practice, the first, second and third groove G1, G2, G3 define, on the base surface 31, substantially a "H" shape, preferably substantially centred in the geometric centre C of the base surface 31 itself.

Preferably the slot S is interposed between the first and second groove G1, G2.

Preferably the first and second grooves G1, G2 are substantially parallel to the main extension direction of said slot S.

Preferably, the length of the slot S measured along the main extension direction may be comprised between about 20% and about 70% of the length of the length of the first and/or second groove G1, G2.

Preferably the main extension of the slot S is substantially orthogonal to the third groove G3.

Preferably the third, second and third grooves G1, G2, G3 have a shorter depth, measured along a direction orthogonal to the base surface 31, than the slot S.

By way of example, the depth of the first, second and third groove G1, G2, G3 can be comprised between about 0.2 mm and about 3 mm.

Preferably the slot S is substantially equidistant to the first and second grooves G1, G2.

By way of example, such distance can be comprised between about 5 mm and about 30 mm.

Preferably the slot S extends symmetrically relative to the first diameter D1 substantially orthogonal to the first and/or second groove G1, G2.

The first portion 30 of the connection element 20 further has a cavity 32 (FIG. 7) whose function is to house the second portion 40.

Figure 7:
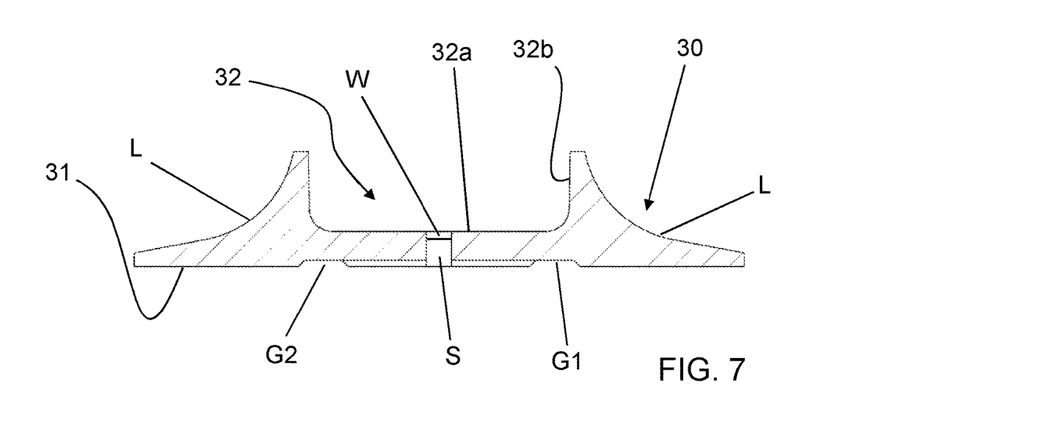
FIG. 7 shows a sectioned view of a portion of the element shown in FIG. 4 according to a plane orthogonal to the one indicated by line a-a in FIG. 5 and passing through the central axis X of said element.

The cavity 32 is defined by a bottom surface 32a and by an internal lateral surface 32b of the first portion 30 of the connection element 20.

Preferably the cavity 32 has a substantially cylindrical shape.

By way of example, such cylindrical shape can have a height comprised between about 3 mm and about 25 mm.

By way of example, such cylindrical shape can have a diameter comprised between about 15 mm and about 50 mm.

Preferably the diameter of said cylindrical shape can be substantially equal to the length of the longer side of the slot S.

Advantageously the slot S is separated from the cavity 32 by a thin wall W (FIG. 7), having a thickness comprised between about 0.2 and about 1 mm. Alternatively, the slot S can cut completely all the first portion 30 in its most central zone, up to the second portion 40.

As schematically shown in the FIGS. 1-7, the first portion 30 of the connection element 20 has preferably a tapered shape from the base surface 31 towards an upper edge of the internal side surface 32b of the first portion 30.

In a preferred embodiment, the profile defined by the external surface of the first portion 30 of the connection element 20 may have, starting from the perimetric zone and approaching to the central axis X, a first linear segment, followed by a curved segment, for example defined by a hyperbolic or parabolic curve.

Preferably the first portion 30 of the connection element 20 has an axial symmetry relative to a main axis or central axis X substantially orthogonal to said base surface 31 and passing through a geometric centre C of the circular shape of the base surface itself.

In practice, the first portion 30 of the connection element 20 has a "volcano" shape, whose crater is formed by the cavity 32.

FIGS. 2-4 show possible embodiments of the first portion 30. In particular, FIG. 2 shows an embodiment having only the slot S; FIG. 3 shows an embodiment having the slot S together with the first, the second grooves G1, G2; FIG. 4 shows an embodiment having both the first, the second and the third grooves G1, G2, G3, and the slot S.

As said, the cavity 32 of the first portion 30 houses the second portion 40 of the connection element 20.

Preferably the second portion 40 is made of a comparatively more rigid material then the one which the first portion 30 is made of.

By way of example, the second portion may be made of a suitable plastic material, for example polyether ketone (e.g. Peek 450).

Preferably the second portion 40 of the connection element 20 has a base wall 41 and a side wall 42.

The base wall 41 is in contact with the bottom surface 32a of the first portion 30; the side wall 42 is in contact with the internal side surface 32b of the first portion 30.

The second portion 40 has advantageously a shape that is at least partially complementary to the shape of the cavity 32.

By way of example, the second portion 40 may have a substantially cylindrical shape, preferably having a diameter comprised between about 15 mm and about 50 mm.

Preferably the second portion has a height, in a direction orthogonal to the base surface 31, comprised between about 20 mm and about 70 mm.

Figure 8:
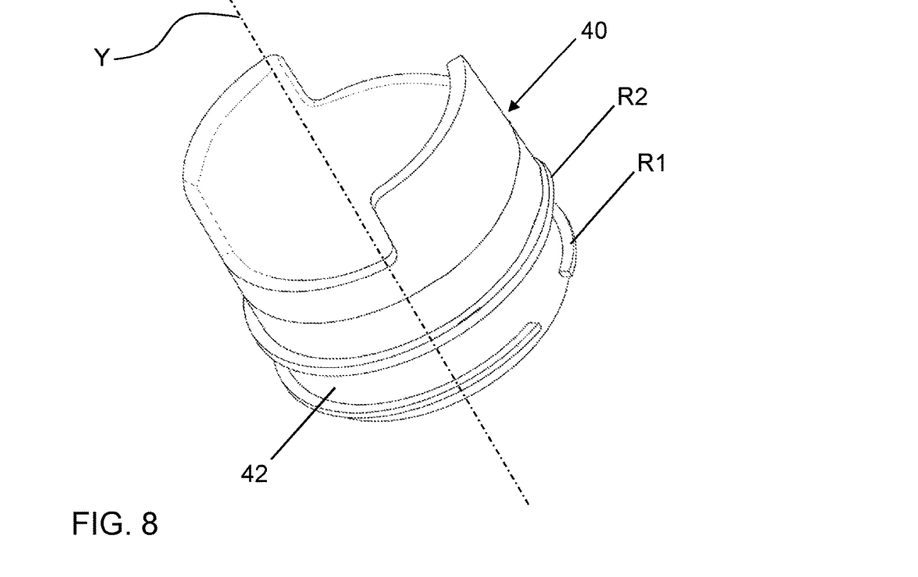
FIG. 8 shows a perspective schematic view of a portion of the element shown in FIGS. 1-6.
Figure 9:
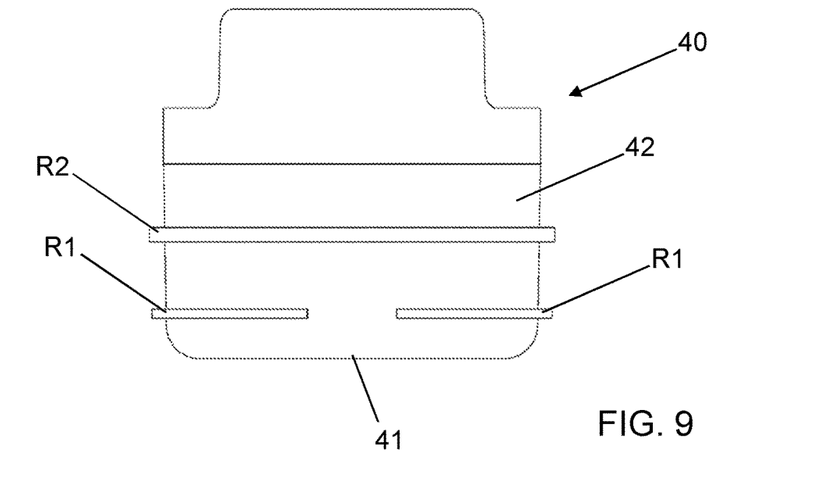
FIG. 9 shows a side view of the portion of FIG. 8.

Preferably the second portion 40 has at least a first rib R1 extending from said side wall 42 in the proximity of said base wall 41.

Advantageously, the rib R1 has at least one interruption, and in particular a pair of interruptions placed on opposite sides relative to a central axis Y of said second portion 40.

Preferably the second portion 40 further has a second rib R2 extending from said side wall 42.

Preferably the second rib R2 is substantially continuous along the external perimetric extension of said side wall 42.

Preferably the second rib R2 is at a longer distance from the bottom wall 41 than the first rib R1.

The electronic unit 10 is housed within the second portion 40 of the connection element 20 and in particular in the housing defined by the base wall 41 and by the side wall 42.

In particular, the electronic unit 10 is kept constrained to the second portion 40 so as to detect the quantities of interest, above all during the rolling of the tyre.

In order to secure the electronic unit 10 to the second portion 40 any suitable technique can be used. For example the electronic unit 10 can be inserted in the second portion 40 in order to be removable. Alternatively, the electronic unit 10 can be permanently secured (for example by gluing) to the second portion 40.

When the electronic unit 10 has to be installed on a tyre 100, the following operations can be carried out (not necessarily in the order provided):
- the electronic unit 10 is suitably housed in and constrained to (possibly in a removable way) the second portion 40 of the connection element 20;
- the base surface 31 of the first portion 30 of the connection element 20 is secured to the inner surface 100a of the tyre 100.

The securing of the base surface 31 to the inner surface 100a of the tyre 100 can be obtained, for example, by gluing.

Preferably the base surface 31 of the first portion 30 of the connection element 20 is secured to the inner surface 100a of the tyre 100 so that the main extension direction of the slot S is substantially orthogonal to a circumferential direction CD of the tyre 100.

Figure 12:
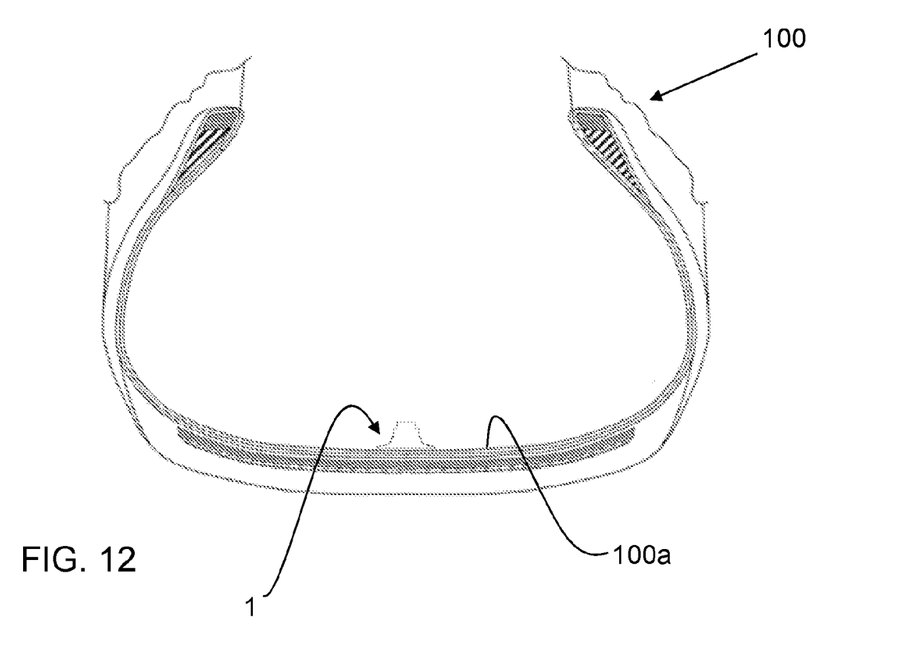
FIG. 12 shows schematically a monitoring device according to the present invention installed inside a tyre.

FIGS. 12 and 13 show a monitoring device 1 fixed to the radially internal surface 100a of the tyre 100. It has to be noted that the dimensions of the monitoring device 1 were deliberately increased relative to those of the tyre, in order to make such figures more understandable.

The invention claimed is:

1. A device for monitoring a tyre for vehicle wheels, comprising:
    an electronic unit adapted to detect at least one characteristic quantity of a tyre and to transmit at least one corresponding parameter representative of said detected quantity; and
    a connection element for keeping said electronic unit constrained to an inner surface of said tyre, said connection element comprising:
        a first portion having a base surface to be secured to the inner surface of said tyre for constraining the connection element to said tyre and a cavity for housing said electronic unit,
        wherein said first portion has at least one slot, which is interposed between the electronic unit and a projection thereof on said base surface, said slot having a distal profile relative to said electronic unit which is entirely contained within a perimeter of said base surface,
        wherein the slot does not join perimetric points of the base surface.

2. The device according to claim 1, wherein said slot has an elongated shape with a main extension direction substantially parallel to said base surface.

3. The device according to claim 2, wherein said slot extends at least between two perimetric points of the projection of the electronic unit on the base surface of said first portion.

4. The device according to claim 3, wherein said two perimetric points are opposite each other relative to a geometric centre of said projection of the electronic unit on the base surface.

5. The device according to claim 4, wherein the projection of the electronic unit on the base surface has a substantially circular profile, said two perimetric points being diametrically opposed points belonging to said substantially circular profile.

6. The device according to claim 3, wherein said main extension direction joins said two perimetric points.

7. The device according to claim 1, wherein a depth of said slot in a direction substantially orthogonal to said base surface is between about 1 mm and about 5 mm.

8. The device according to claim 7, wherein a width of said slot in a direction substantially orthogonal to said main extension direction and parallel to said base surface is between about 50% and about 150% of said depth.

9. The device according to claim 1, wherein said slot has a substantially parallelepiped shape.

10. The device according to claim 1, wherein said first portion further comprises one or more grooves formed in said base surface.

11. The device according to claim 10, wherein said one or more grooves comprise at least a first and a second groove.

12. The device according to claim 11, wherein said slot has an elongated shape with a main extension direction substantially parallel to said base surface, and wherein said first and second grooves are substantially parallel to the main extension of said slot.

13. The device according to claim 11, wherein said first and second grooves are substantially equidistant from said slot.

14. The device according to claim 11, wherein said first and second grooves join perimetric points of said base surface.

15. The device according to claim 11, wherein said slot has a depth, measured in a direction orthogonal to said base surface, which is greater than a depth of said first and second grooves.

16. The device according to claim 1, wherein the first portion of said connection element has a shape which is tapered from said base surface toward an upper edge of said cavity.

17. A tyre for vehicle wheels, comprising:
an inner surface having a substantially toroidal shape; and
a device for monitoring a tyre for vehicle wheels, operationally connected to said inner surface of said tyre, comprising:
an electronic unit adapted to detect at least one characteristic quantity of said tyre and to transmit at least one corresponding parameter representative of said detected quantity; and
a connection element for keeping said electronic unit constrained to the inner surface of said tyre, said connection element comprising:
at least a first portion with a base surface secured to the inner surface of said tyre for constraining the connection element to said tyre and a cavity for housing said electronic unit,
wherein said first portion has at least one slot, said slot being interposed between the electronic unit and a projection thereof on said base surface, said slot having a distal profile relative to said electronic unit which is entirely contained within a perimeter of said base surface,
wherein the slot does not join perimetric points of the base surface.

18. The tyre according to claim 17, wherein said monitoring device is operationally connected to said inner surface of said tyre in a manner such that a main extension direction of said slot is substantially orthogonal to a circumferential direction of said tyre.

19. A method for installing an electronic unit in a tyre for vehicular wheels, comprising:
providing a tyre for vehicle wheels, with an inner surface having a substantially toroidal shape;
providing an electronic unit adapted to detect at least one characteristic quantity of a tyre and to transmit at least one corresponding parameter representative of said detected quantity;
providing a connection element comprising at least a first portion having a base surface and a cavity;
placing said electronic unit into the cavity of the first portion of said connection element, said first portion having at least one slot interposed between the electronic unit and the projection thereof on said base surface, said slot having a distal profile relative to said electronic unit which is entirely contained within a perimeter of said base surface, wherein the slot does not join perimetric points of the base surface; and
securing the base surface of the first portion of said connection element to the inner surface of said tyre to constrain the connection element to said tyre.

20. The method according to claim 19, wherein the base surface of the first portion of said connection element is secured to the inner surface of said tyre in a manner such that a main extension direction of said slot is substantially orthogonal to a circumferential direction of said tyre.

* * * * *